E. J. KAHL.
INSULATED HANDLE.
APPLICATION FILED MAR. 23, 1918.
1,297,861.
Patented Mar. 18, 1919.
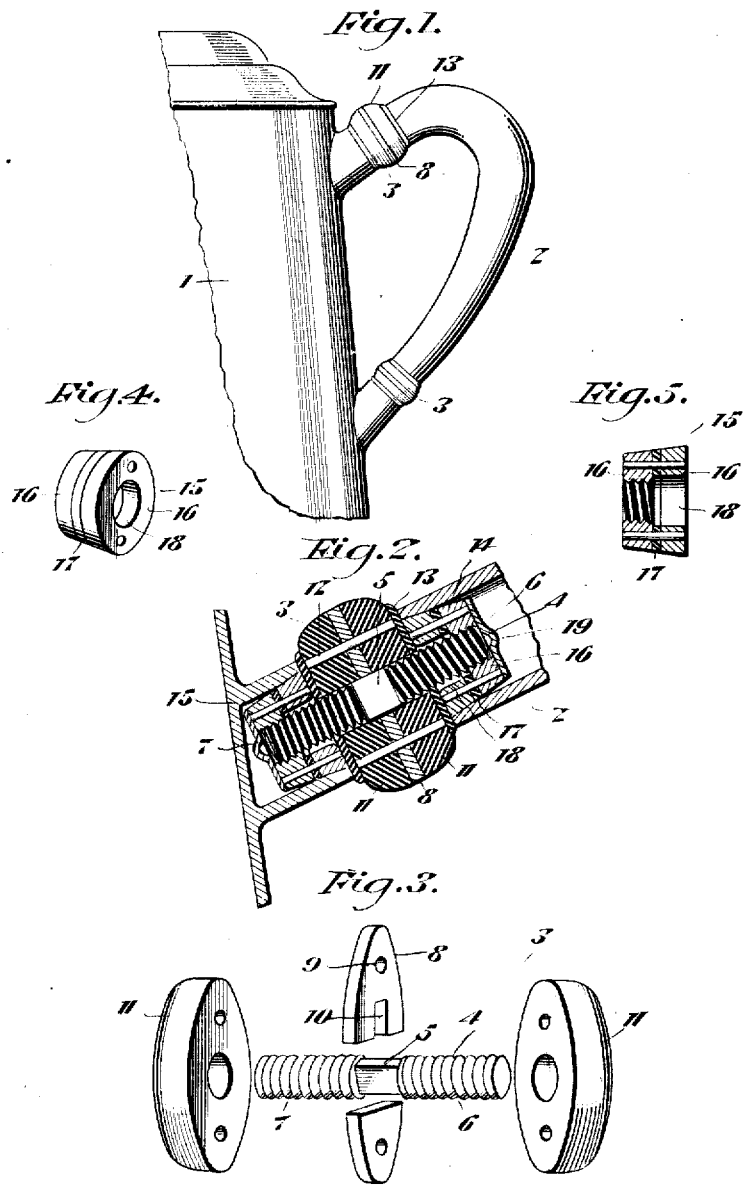

UNITED STATES PATENT OFFICE.

EDMUND J. KAHL, OF WALLINGFORD, CONNECTICUT.

INSULATED HANDLE.

1,297,861.  Specification of Letters Patent.  Patented Mar. 18, 1919.

Application filed March 23, 1918. Serial No. 224,103.

*To all whom it may concern:*

Be it known that I, EDMUND J. KAHL, a citizen of the United States, residing at Wallingford, in the county of New Haven and State of Connecticut, have invented new and useful Improvements in Insulator-Handles, of which the following is a specification.

This invention relates to new and useful improvements in means for insulating the handles of vessels, particularly those made of silver and like metals, from the body of the vessels, and the principal object of the invention is to provide means whereby the insulating parts are detachably secured to both the handle and the vessel.

Another object of the invention is to provide the insulating parts with means whereby they may be attached to both the vessel and the handle in one operation.

Another object of the invention is to provide means for making the insulating parts self-adjusting so that said parts will conform to the contacting parts of the handle or vessel when said parts are placed in connection with each other.

Another object of the invention is to provide means for insulating the socket members which receive the securing means carried by the insulating parts, from the parts carrying said socket members.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a part view of a vessel with my invention applied thereto.

Fig. 2 is a section on line 2—2 of Fig. 1.

Fig. 3 is a view showing the parts forming the insulatng member separated.

Fig. 4 is a view of one of the socket members.

Fig. 5 is a sectional view of said member.

As shown in these views the vessel is shown at 1 and the handle at 2. The handle is insulated from the vessel by means of the insulating parts or members 3. Each of these members consists of a stem 4 provided with a flattened center part 5. This stem is provided with right hand screw threads on the part 6 while the part 7 has left hand screw threads. 8 is a metal plate formed in two parts, each part provided with an opening 9 and one part having a slot 10 which engages the flattened part 5. 11 indicates the two washers made of insulating material and located on each side of the plate and said washers and the two parts of the plate are secured together by the pins 12 passing through the washers and the openings 9 in the parts of the plate. In this manner the washers and plate are secured to the stem and as the flattened part 5 is of greater length than the width of the plate said plate with the washers thereon, may have a certain amount of movement on the stem. 13 is a pair of small washers made of insulating material and covering the ends of the pins that project through the washers 11. As will be seen the screw threaded ends of the stem project considerably beyond the insulating member formed by the washers and plate and these ends engage the socket members 14 and 15 placed in the handle and vessel. Each of these socket members is composed of a pair of metal disks 16 separated by a disk 17 of insulating material.

As shown the socket members are of frusto-conical shape so that the outer end of said socket member may be connected with the handle or vessel, by soldering or the like, while the inner end or inner disk will be out of contact with the metal of said handle or vessel. An opening 18 is formed through the center of said socket and the part of the opening in the outer disk is made plain and of larger diameter than the diameter of the stem so as to not contact with said stem while that part of the opening in the inner disk is screw threaded to engage the screw threads of the stem. In this manner any heat that may be transmitted by the stem will be prevented from being transmitted to the handle by the socket member. The socket member in the vessel will be prevented from transmitting the heat from the contacting part of said vessel to the stem.

As will be understood the socket member in the handle will be provided with right hand screw threads while the socket member in the vessel will be provided with left hand screw threads or vice versa. The inner end of each socket member is provided with a plate 19 which may be connected with the inner disk by solder or the like for covering the end of the opening so as to prevent any heat from passing through said opening into the handle.

It will thus be seen that after the socket members are placed in the vessel and handle that the handle may be easily and quickly connected with the vessel by means of the insulating member. In doing this the screw threaded ends of the stem are placed in the openings in the socket members and then by turning the insulating member in the proper direction the right and left hand screw threads will engage the threads in the socket members and thus connect the parts together. By having the insulating member movable on the stem the said member will adjust itself even though one end of the stem should enter its socket before the other end, thus eliminating any chance of one side becoming tight before the other. This arrangement of parts will also make a snug fit of the insulating member with the adjacent parts even though the said parts are irregular.

It will be seen that if the insulating washers should become worn the parts may be kept in close contact by simply screwing up the stem to counteract such wear.

It is thought from the foregoing description that the advantages and novel features of my invention will be readily apparent.

I desire it to be understood that I may make such changes in the construction and in the combination and arrangement of the several parts, provided that such changes fall within the scope of the appended claims.

What I claim is:—

1. A device of the class described comprising an insulating member, a stem passing through said member and provided with right and left-hand screw threads on its ends, sockets for receiving said stem and having parts permanently attached to the handle and vessel, said parts having holes therein of greater diameter than the stem and other parts for receiving said stem and means for insulating the stem engaging part of each socket from the other part and from the handle or vessel.

2. A device of the class described comprising an insulating member, a stem passing through said member and provided with right and left-hand screw threads, sockets for receiving said stem and having parts permanently attached to the handle and vessel, said parts having holes therein of greater diameter than the stem and other parts receiving the ends of the stem, means for insulating the stem engaging part of each socket from the other part and from the vessel or handle and a plate covering the free end of each socket.

3. A device of the class described comprising an insulating member, a stem connected with said member and having right and left hand screw threads thereon, socket members in the handle and vessel for receiving said stem, each of said socket members being of frusto-conical shape and provided with a central opening and formed of a pair of metal disks and a central disk of insulating material, the opening in the inner disk being screw threaded while the opening in the outer disk is plain and of greater diameter than the stem.

In testimony whereof I affix my signature.

EDMUND J. KAHL.

Copies of this patent may be obtained for five cents each, by addressing the "Commissioner of Patents, Washington, D. C."